US012518367B2

(12) United States Patent
Komatireddi et al.

(10) Patent No.: US 12,518,367 B2
(45) Date of Patent: Jan. 6, 2026

(54) DEFECT CLASSIFICATION OF PROCESSED WAFERS

(71) Applicant: Applied Materials, Inc., Santa Clara, CA (US)

(72) Inventors: Rahul Reddy Komatireddi, Bangalore (IN); Rohith Cherikkallil, Bangalore (IN); Sneha Rupa Kongara, Bangalore (IN); Satwik Swarup Mishra, Bengaluru (IN); Sachin Dangayach, San Jose, CA (US); Si En Chan, Singapore (SG); Remus Zhen Hui Koh, Singapore (SG); Prayudi Lianto, Singapore (SG); Yin Wei Lim, Singapore (SG); Peng Suo, Singapore (SG); Krishnaprasad Reddy Mallavaram, Bengaluru (IN); Khor Wui Cheng, Singapore (SG)

(73) Assignee: Applied Materials Inc., Santa Clara, CA (US)

( * ) Notice: Subject to any disclaimer, the term of this patent is extended or adjusted under 35 U.S.C. 154(b) by 392 days.

(21) Appl. No.: 18/128,487

(22) Filed: Mar. 30, 2023

(65) Prior Publication Data

US 2024/0331126 A1 Oct. 3, 2024

(51) Int. Cl.
*G06T 7/00* (2017.01)
*G06V 10/764* (2022.01)
*G06V 10/82* (2022.01)

(52) U.S. Cl.
CPC .......... *G06T 7/0004* (2013.01); *G06V 10/764* (2022.01); *G06V 10/82* (2022.01); *G06T 2207/30148* (2013.01)

(58) Field of Classification Search
None
See application file for complete search history.

(56) References Cited

U.S. PATENT DOCUMENTS 6,407,373 B1 6/2002 Dotan
7,987,150 B1 7/2011 Luu et al.
(Continued)

FOREIGN PATENT DOCUMENTS

CN 102136061 A 7/2011
KR 10-1561778 B1 10/2015
(Continued)

OTHER PUBLICATIONS

Wooksoo Shin et al., Mixup-based classification of mixed-type defect patterns in wafer bin maps, Computers & Industrial Engineering. vol. 167, Article No. 107996, Feb. 5, 2022.
(Continued)

*Primary Examiner* — Leon Flores
(74) *Attorney, Agent, or Firm* — Moser Taboada

(57) ABSTRACT

A method and apparatus for training a learning model for automatic defect detection and classification of at least a portion of a processed wafer include receiving labeled images having defect classification types and features for portions of a post-processed wafer, creating a first training set comprising the received labeled images, training the machine learning model to automatically classify wafer portions based on at least one detected defect in respective wafer portions using the first training set, receiving labeled wafer profiles having respective downstream yield data, creating a second training set comprising the labeled wafer profiles and training the machine learning model, using the second training set, to automatically determine a respective downstream yield of a wafer based on a respective wafer profile. The machine learning model can be applied to at least one unlabeled wafer image to determine at least one defect classification for at least one portion of a wafer.

18 Claims, 7 Drawing Sheets

(56) References Cited

U.S. PATENT DOCUMENTS

| | | | | |
|---|---|---|---|---|
| 2004/0120569 | A1 | 6/2004 | Hung | |
| 2016/0125583 | A1 | 5/2016 | Amanullah et al. | |
| 2019/0067060 | A1 | 2/2019 | Plihal et al. | |
| 2019/0073568 | A1* | 3/2019 | He | G06T 7/001 |
| 2021/0201460 | A1* | 7/2021 | Gong | G06N 3/045 |
| 2021/0209410 | A1* | 7/2021 | Pan | G01N 21/9501 |
| 2022/0108436 | A1 | 4/2022 | Kang et al. | |
| 2023/0054119 | A1 | 2/2023 | Pai et al. | |
| 2023/0069493 | A1 | 3/2023 | Kim et al. | |
| 2023/0385502 | A1* | 11/2023 | Chou | G06N 3/045 |

FOREIGN PATENT DOCUMENTS

| | | | |
|---|---|---|---|
| KR | 10-2019-0134275 | A | 12/2019 |
| WO | WO 2019-129160 | A1 | 7/2019 |
| WO | WO 2021-166161 | A1 | 8/2021 |

OTHER PUBLICATIONS

International Search Report for PCT/US2024/012766, dated May 17, 2024.

International Search Report for PCT/US2024/012764, dated May 17, 2024.

International Search Report for PCT/US2024/012761. dated May 21. 2024.

* cited by examiner

DEFECT CLASSIFICATION OF PROCESSED WAFERS

FIELD

Embodiments of the present principles generally relate to classifying defects on wafers and in particular to the automatic defect detection and classification of at least a portion of a processed wafer using machine learning techniques.

BACKGROUND

Wafer defects can be caused by processes in which wafers are manipulated. There currently exists many manual processes for detecting and categorizing wafer defects. For example, Confocal Scanning Acoustic Microscopy (cSAM) is a quick, non-destructive analysis technique, which uses ultrasound waves to detect changes in acoustic impedances in integrated circuits (ICs) and other similar materials. cSam techniques can be used to manually detect defects in wafers after, for example, hybrid bonding processes.

Manual cSAM defect classification and other such manual defect classification processes are tedious and may not provide accurate correlation to a downstream bonding performance.

What is needed is a process to automate the detection and categorization of post-process wafer defects that occur on wafers due to the various processes involved in processing wafers, such as the Hybrid Bonding of wafers, that accurately and efficiently correlate to downstream bonding performance.

SUMMARY

Methods and apparatus for automatic defect detection and classification of at least a portion of a processed wafer are provided herein.

In some embodiments, a method for training a machine learning (ML) model for automatic defect detection and classification of at least a portion of a processed wafer includes receiving labeled images having multiple defect classification types and respective features for at least a portion of a post-processed wafer, creating a first training set comprising the received labeled images having the multiple defect classification types and respective features for the portions of the wafer, training the machine learning model in a first stage to automatically classify wafer portions based on at least one detected defect in a respective wafer portion using the first training set, receiving labeled wafer profiles having respective downstream yield data, creating a second training set comprising the labeled wafer profiles having the respective downstream yield data, and training the machine learning model, using the second training set, to automatically determine a respective downstream yield of a wafer based on a respective wafer profile.

In some embodiments, a method for automatic defect detection and classification of at least a portion of a processed wafer using a trained machine learning (ML) model includes receiving at least one unlabeled image of at least a portion of a processed wafer, processing the at least a portion of the processed wafer to separate image pixels depicting image objects from image pixels depicting image background, determining features for the image pixels depicting image objects, applying the trained ML model to the features determined for the image pixels depicting image objects, the machine learning model having been trained using a first set of labeled images including features associated with and identifying respective wafer defect classification types, and determining a defect classification for at least one portion of the at least one unlabeled wafer image using the trained machine learning model.

In some embodiments, the method can further include determining a wafer profile for at least one wafer depicted in the unlabeled wafer image by compiling determined defect classification types for at least some of the portions of the at least one portion of the at least one unlabeled wafer image.

In some embodiments, the method can further include determining a downstream yield of at least one wafer depicted in the unlabeled image using the trained machine learning model, the machine learning model having been further trained using a second set of labeled wafer profiles having respective downstream yield data for imaged wafers to train the machine learning model to automatically determine a respective downstream yield of a wafer based on a determined, respective wafer profile.

In some embodiments, a downstream yield of a wafer is determined based on a compilation of an electrical conductivity of each of the pixels of the at least the portion of the wafer.

In some embodiments, the method can further include determining if a wafer contains a critical defect from the at least one determined wafer profile.

In some embodiments, an apparatus for training a machine learning (ML) model for automatic defect detection and classification of at least a portion of a processed wafer includes a processor and a memory. The memory has stored therein at least one program, the at least one program including instructions which, when executed by the processor, cause the apparatus to perform a method including receiving labeled images having multiple defect classification types and respective features for at least a portion of a post-processed wafer, creating a first training set comprising the received labeled images having the multiple defect classification types and respective features for the portions of the wafer, training the machine learning model in a first stage to automatically classify wafer portions based on at least one detected defect in a respective wafer portion using the first training set, receiving labeled wafer profiles having respective downstream yield data, creating a second training set comprising the labeled wafer profiles having the respective downstream yield data, and training the machine learning model, using the second training set, to automatically determine a respective downstream yield of a wafer based on a respective wafer profile.

In some embodiments, an apparatus for automatic defect detection and classification of at least a portion of a processed wafer using a trained machine learning (ML) model includes a processor and a memory. The memory has stored therein at least one program, the at least one program including instructions which, when executed by the processor, cause the apparatus to perform a method including receiving at least one unlabeled image of at least a portion of a processed wafer, processing the at least a portion of the processed wafer to separate image pixels depicting image objects from image pixels depicting image background, determining features for the image pixels depicting image objects, applying the trained ML model to the features determined for the image pixels depicting image objects, the machine learning model having been trained using a first set of labeled images including features associated with and identifying respective wafer defect classification types, and determining a defect classification for at least one portion of the at least one unlabeled wafer image using the trained machine learning model.

In some embodiments the method performed by the apparatus further includes determining a wafer profile for at least one wafer depicted in the unlabeled wafer image by compiling determined defect classification types for at least some of the portions of the at least one portion of the at least one unlabeled wafer image.

In some embodiments the method performed by the apparatus further includes determining a downstream yield of at least one wafer depicted in the unlabeled image using the trained machine learning model, the machine learning model having been further trained using a second set of labeled wafer profiles having respective downstream yield data for imaged wafers to train the machine learning model to automatically determine a respective downstream yield of a wafer based on a determined, respective wafer profile.

In some embodiments, the method performed by the apparatus further includes determining if a wafer contains a critical defect from the at least one determined wafer profile.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
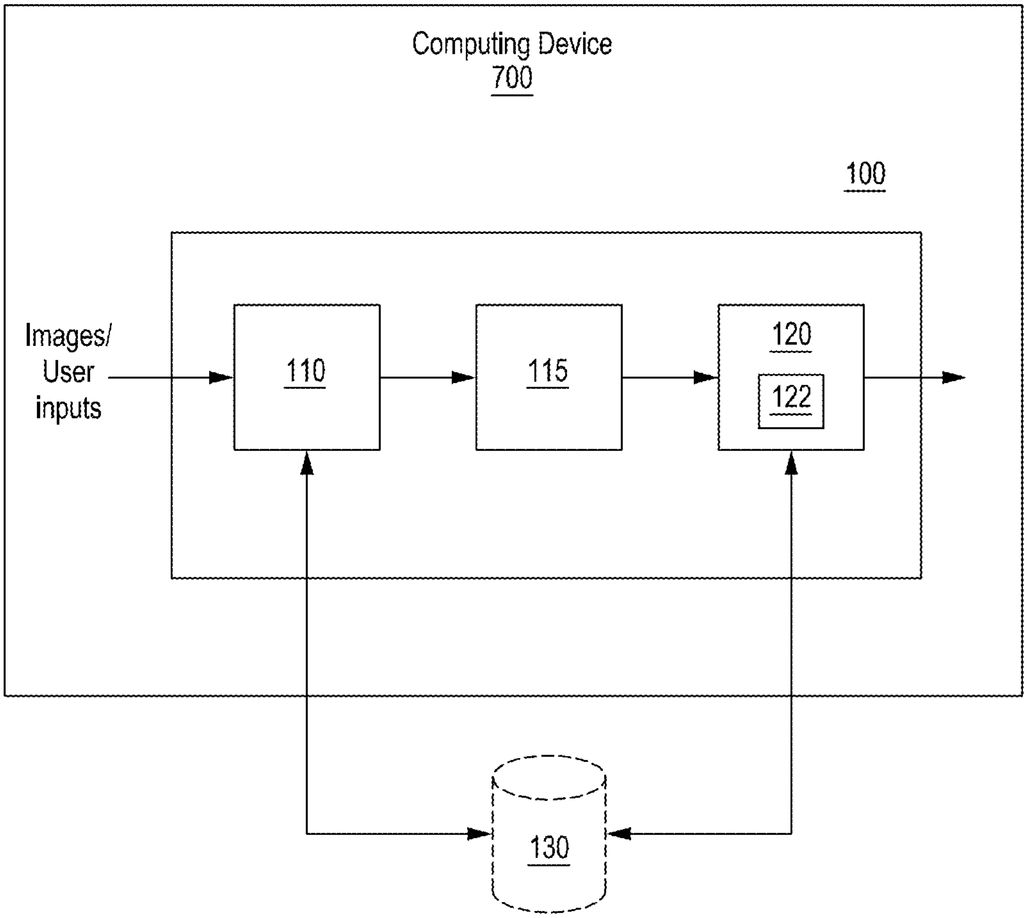
FIG. 1 depicts a high-level block diagram of a post-processing wafer defect detection and classification system in accordance with an embodiment of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

The following detailed description describes techniques (e.g., methods, apparatuses, and systems) for the automatic categorization of at least respective portions of wafers after various processes, such as Hybrid Bonding processes, are applied to the wafer. In some embodiments, such techniques can include a compilation of at least some or all portions of a post-processed wafer to determine a respective downstream Device Performance and Yield (DPY) of the wafers. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles are described herein with respect to specific wafer defects and specific classification types/categories related to defects that can occur during a hybrid bonding process, embodiments of the present principles can be applied to automatically detect and classify substantially any wafer portions having defects that occur during any processes involving wafers into substantially any classification types/categories.

Throughout this disclosure the terms learning model, machine learning (ML) model, ML algorithm, and ML classifier are used interchangeably to describe an ML process that can be trained to recognize/detect and distinguish between various types of defects that occur on wafers and to classify the defects into categories. In addition, throughout this disclosure, the terms classify and categorize, and any derivatives, can be used interchangeably.

Embodiments of the present principles enable the automatic defect detection and categorization of wafer portions, for example after wafer processing, such as bonding processes. In some embodiments of the present principles, an AI/ML algorithm of the present principles is trained to identify defects and classify portions of wafers based on identified defects, for example, using cSAM techniques. In some embodiments, the AI/ML algorithm of the present principles provides cSAM defect classification types and can further be trained to provide a correlation to downstream Device Performance and Yield (DPY) based on detected defects and classified wafer portions.

FIG. 1 depicts a high-level block diagram of a post-processing wafer defect detection and classification system 100 in accordance with an embodiment of the present principles. In the embodiment of FIG. 1, the post-processing wafer defect detection and classification system 100 illustratively includes an image processing module 110, a feature extraction module 115, and a training and defect detection/classification module 120. In the embodiment of FIG. 1 the training and defect detection/classification module 120 includes a learning model 122 (described in greater detail below). The post-processing wafer defect detection and classification system 100 of FIG. 1 further illustratively includes an optional storage device 130.

As depicted in FIG. 1, embodiments of a post-processing wafer defect detection and classification system of the present principles, such as the post-processing wafer defect detection and classification system 100, can be implemented via a computing device 700 (described in greater detail below) in accordance with the present principles.

In the post-processing wafer defect detection and classification system 100 of FIG. 1, the training and defect detection/classification module 120 can receive data including labeled images and respective features of at least portions of a processed wafer. The labeled images and respective features identify for the training model 122 a respective category for the wafer section which can include defects, such as post-bonding wafer defects, which can include at least defect categories including but not limited to, good, void or delamination. In some embodiments, labeled image data can be received from/retrieved from the optional storage device 130. Alternatively or in addition, the training and defect detection/classification module 120 can receive labeled image data and associated features from a user of a post-processing wafer defect detection and classification system of the present principles such as the post-processing wafer defect detection and classification system 100 of FIG. 1. The labeled image data and features received by the training and defect detection/classification module 120 can be used to train the learning model 122. For example, in some embodiments, the training data received by the training and defect detection/classification module 120 can include labeled cSAM images and associated features of wafer sections having respective defect categories and associated features for each of the wafer sections. The training and defect detection/classification module 120 uses the received training data (e.g., the labeled cSAM) to train the learning model 122 to recognize/detect and distinguish between various types of defects that occur on wafers after processing and to classify the wafer sections into categories including, but not limited to, good, void or delamination.

In some embodiments, a learning model/algorithm of the present principles, such as the learning model/algorithm 122, can include a multi-layer neural network comprising nodes that are trained to have specific weights and biases. In some embodiments, the learning model/algorithm 122 employs artificial intelligence techniques or machine learning techniques to analyze received data images including wafer defects on at least a portion of a processed wafer. In some embodiments in accordance with the present principles, suitable machine learning techniques can be applied to learn commonalities in sequential application programs and for determining from the machine learning techniques at what level sequential application programs can be canonicalized. In some embodiments, machine learning techniques that can be applied to learn commonalities in sequential application programs can include, but are not limited to, regression methods, ensemble methods, or neural networks and deep learning such as 'Seq2Seq' Recurrent Neural Network (RNNs)/Long Short-Term Memory (LSTM) networks, Convolution Neural Networks (CNNs), graph neural networks applied to the abstract syntax trees corresponding to the sequential program application, and the like. In some embodiments a supervised machine learning (ML) classifier/algorithm could be used such as, but not limited to, Multilayer Perceptron, Random Forest, Naive Bayes, Support Vector Machine, Logistic Regression and the like. In addition, in some embodiments, the ML classifier/algorithm of the present principles can implement at least one of a sliding window or sequence-based techniques to analyze data.

As described above, the learning model/algorithm 122 can be trained using a plurality (e.g., hundreds, thousands, etc.) of instances of labeled image data in which the training data comprises a plurality of labeled images and respective features of post-processed wafer portions to train a learning model/algorithm of the present principles to recognize/detect and distinguish between various types of defects on at least a portion of the wafer and to classify the portions into categories.

In some embodiments, in a second stage, a learning model/algorithm of the present principles, such as the learning model/algorithm 122 of FIG. 1, can be trained to provide a correlation to downstream Device Performance and Yield (DPY) based on detected defects and classified wafer portions. That is, in some embodiments, the learning model 122 can be trained using a plurality (e.g., hundreds, thousands, etc.) of instances of generated, labeled wafer maps (described in greater detail below) in which the wafer maps have been correlated to a final throughput and/or effectiveness of a respective wafer to train a learning model/algorithm of the present principles to provide a correlation between a generated wafer map and downstream Device Performance and Yield (DPY). In some embodiments, a learning model of the present principles can be trained, for example using wafer maps, to recognize critical failures in processed wafers.

After the training of a learning model of the present principles, such as the learning model 122 of the training and defect detection/classification module 120 of FIG. 1, a post-processing wafer defect detection and classification system of the present principles, such as the post-processing wafer defect detection and classification system 100 of FIG. 1, can be used to detect defects and categorize sections of post-processed wafers using received wafer images into categories including, but not limited to, good, void or delamination. For example and with reference back to FIG. 1, the image processing module 110 of the post-processing wafer defect detection and classification system 100 can receive images of post-processed wafers. As described above, in some embodiments, such images can include cSAM images of processed wafers. The image processing module 110 processes received images to prepare the images of the processed wafers for classification in accordance with the present principles.

Figure 2:
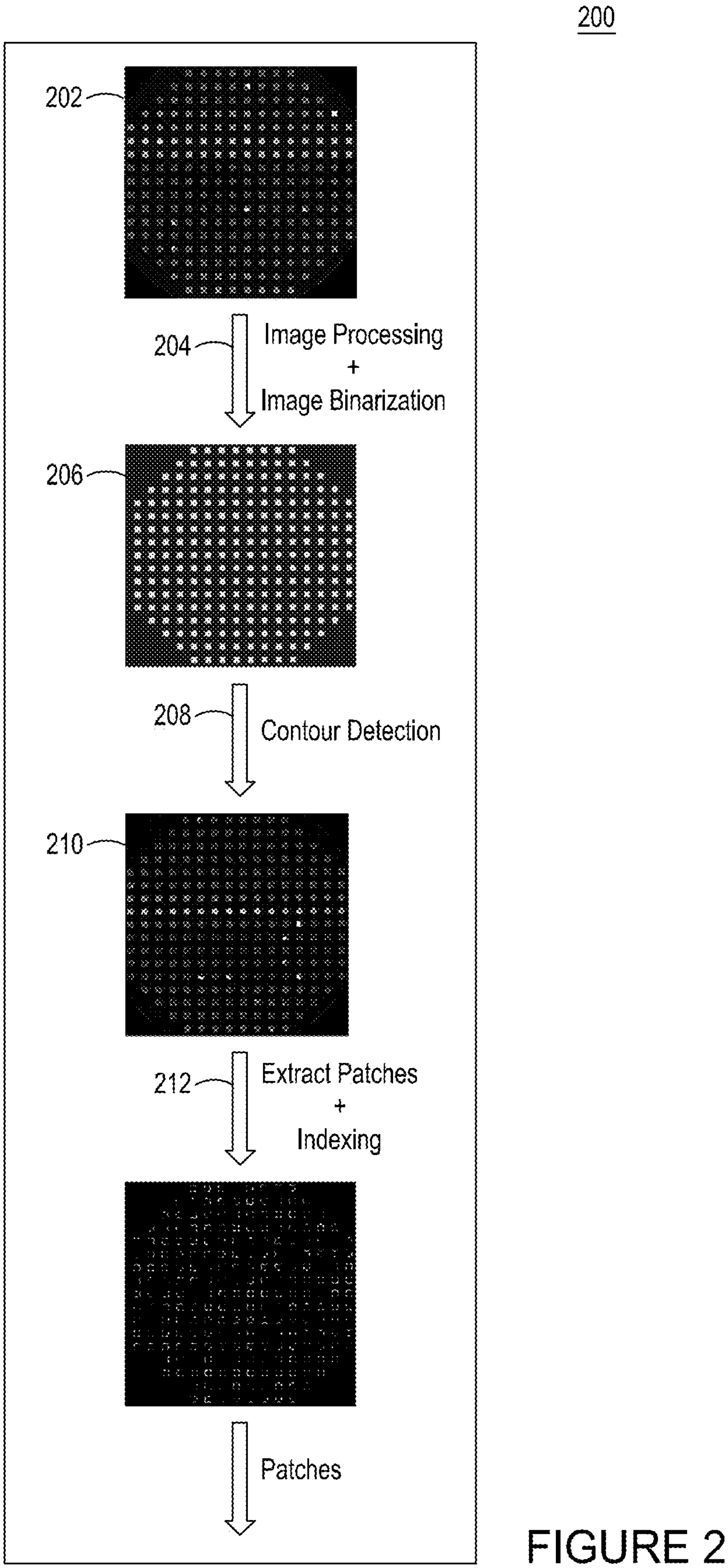
FIG. 2 depicts a graphical representation of a functional architecture of an image processing module in accordance with an embodiment of the present principles.

For example, FIG. 2 depicts a graphical representation 200 of a functional architecture of an image processing module of the present principles in accordance with an embodiment. As depicted in FIG. 2, in some embodiments an image processing module of the present principles, such as the image processing module 110 of the post-processing wafer defect detection and classification system 100, can apply a binarization process 204 to a received post-processed wafer image 202 to, for example, separate objects of the image data from the background data. For example in some embodiments, each pixel of the received post-processed wafer image 202 can be labeled as a background pixel or an image object pixel.

The image processing module of the present principles, such as the image processing module 110 of FIG. 1, can then apply a contour detection process 208 to the segmented image 206 to detect the borders of the image objects in, for example each of the pixels, and to localize the image objects in the received post-processed wafer image. The image processing module of the present principles can then apply a patching process 212 to the contoured image segments 210 to index the values of each of the pixels.

Although in the embodiment of FIG. 2 described above and the description below at least a portion of a wafer is divided into pixels and processing techniques are described as being applied to each pixel of portions of a wafer depicted in a wafer image, alternatively or in addition, in some embodiments, pixels can be combined to represent dies on at least a portion of a wafer. In such embodiments, dies of the at least portion of the wafer can be identified using at least the techniques described in the embodiment of FIG. 2. As such, in some embodiments of the present principles described throughout this disclosure, processes described as being applied to/with reference to pixels, can be applied to/with reference to pixels combined to represent a die of a wafer. For example, in some embodiments and as described in the disclosure below, an electrical effectiveness/conductivity of specific dies (instead of pixels) on at least portions of a wafer can be determined based on identified, respective defects of each of the dies (instead of pixels) and, as such, a downstream yield of a wafer can be determined based on a compilation (i.e., wafer profile/map) of the electrical effectiveness/conductivity of each of the dies (instead of pixels) on at least a portion of the wafer.

The indexed patches generated from the received post-processed wafer images by the image processing module of the present principles can be communicated to a feature extraction module of the present principles, such as the feature extraction module 115 of the post-processing wafer defect detection and classification system 100 of FIG. 1. The feature extraction module of the present principles applies feature extraction techniques to the indexed patches to help to reduce an amount of abstract/redundant data from the data of the indexed patches to enable the building of a model with less machine effort and to increase the speed of learning and generalization steps in a machine learning process to be applied to the extracted features by a training and defect detection/classification module of the present principles, such as the training and defect detection/classification module 120 of the post-processing wafer defect detection and classification system 100 of FIG. 1.

Figure 3:
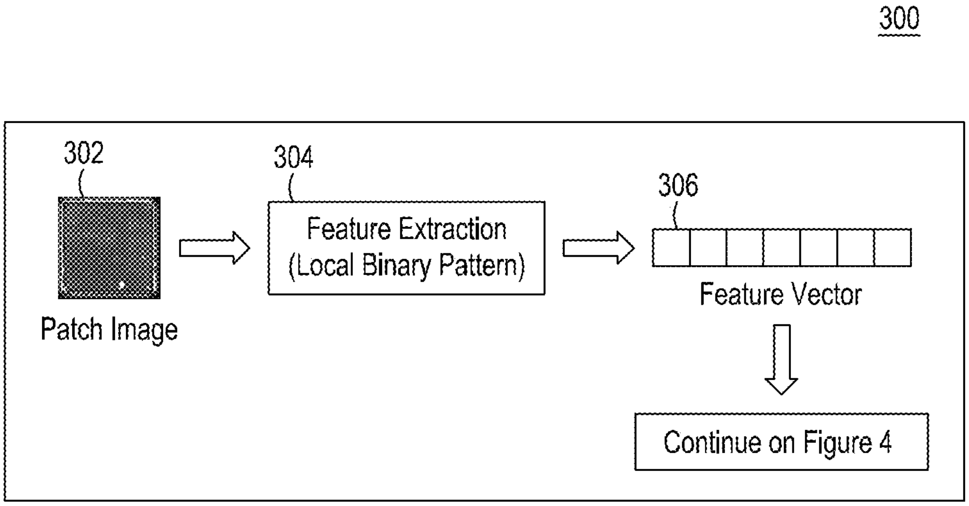
FIG. 3 depicts a graphical representation of a functional architecture of a feature extraction module in accordance with an embodiment of the present principles.

For example, FIG. 3 depicts a graphical representation 300 of a functional architecture of a feature extraction module of the present principles in accordance with an embodiment. In the embodiment of FIG. 3, a feature extraction module of the present principles, such as the feature extraction module 115 of FIG. 1, applies a local binary pattern feature extraction technique 304 to patch images 302 received from an image processing module of the present principles, such as the image processing module 110 of the post-processing wafer defect detection and classification system 100 of FIG. 1 to determine feature vectors 306 from the received patch images 302. For example, in some embodiments a local binary pattern feature extraction technique 304 analyzes the texture of the defect image, where the defect classes can vary based on the luminosity effects and the feature representation of the image can capture the key defect class information using this correlation. A texture operator can label the pixels of an image by thresholding the neighborhood of each pixel and consider the result as a binary number, which is a weighted sum with respect to the base power of 2. The final normalized histogram information of the resultant image can be used as the feature vector.

Figure 4:
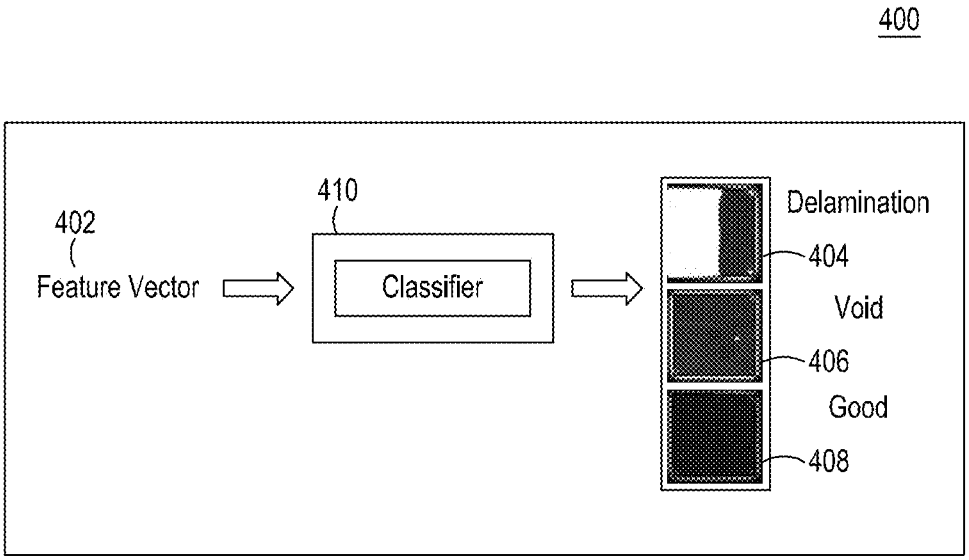
FIG. 4 depicts a graphical representation of a functional architecture of a training and defect detection/classification module in accordance with an embodiment of the present principles.

The determined feature vectors 306 can be communicated to a training and defect detection/classification module of the present principles, such as the training and defect detection/classification module 120 of the post-processing wafer defect detection and classification system 100 of FIG. 1. For example, FIG. 4 depicts a graphical representation 400 of a functional architecture of a training and defect detection/classification module of the present principles in accordance with an embodiment. In the embodiment of FIG. 4, a training and defect detection/classification module of the present principles, such as the training and defect detection/classification module 120 of the post-processing wafer defect detection and classification system 100 of FIG. 1, receives the feature vectors 402 determined by a feature extraction module of the present principles and classifies 410 the feature vectors using the learning model 122 into at least a delamination category 404, a void category 406, and a good category 408.

Using the techniques described above, a post-processing wafer defect detection and classification system of the present principles, such as the post-processing wafer defect detection and classification system 100 of FIG. 1, can determine a profile (e.g., wafer map) of an image of a post-processed wafer by compiling at least some of the classified wafer sections. Using the determined wafer profile having at least some or all of the categorized portions of the image of the post-processed wafer, the defect detection/classification module 120 of the post-processing wafer defect detection and classification system 100 can use the learning model 122 to determine a final throughput and/or effectiveness of a respective post-processed wafer. That is, as described above, in at least some embodiments, the learning model 122 can be trained using a plurality (e.g., hundreds, thousands, etc.) of instances of generated, labeled wafer maps, in which the wafer maps have been correlated to a final throughput and/or effectiveness of a respective wafer, to train a learning model/algorithm of the present principles to provide a correlation between a generated wafer map and downstream Device Performance and Yield (DPY). Similarly, and in accordance with embodiments of the present principles, a learning model of the present principles can be trained to determine if a number of categorized defect(s) on a wafer, over a determined threshold, is critical and if the wafer having the particular number of categorized defects has to be scrapped or removed from a wafer processing system.

Figure 5:
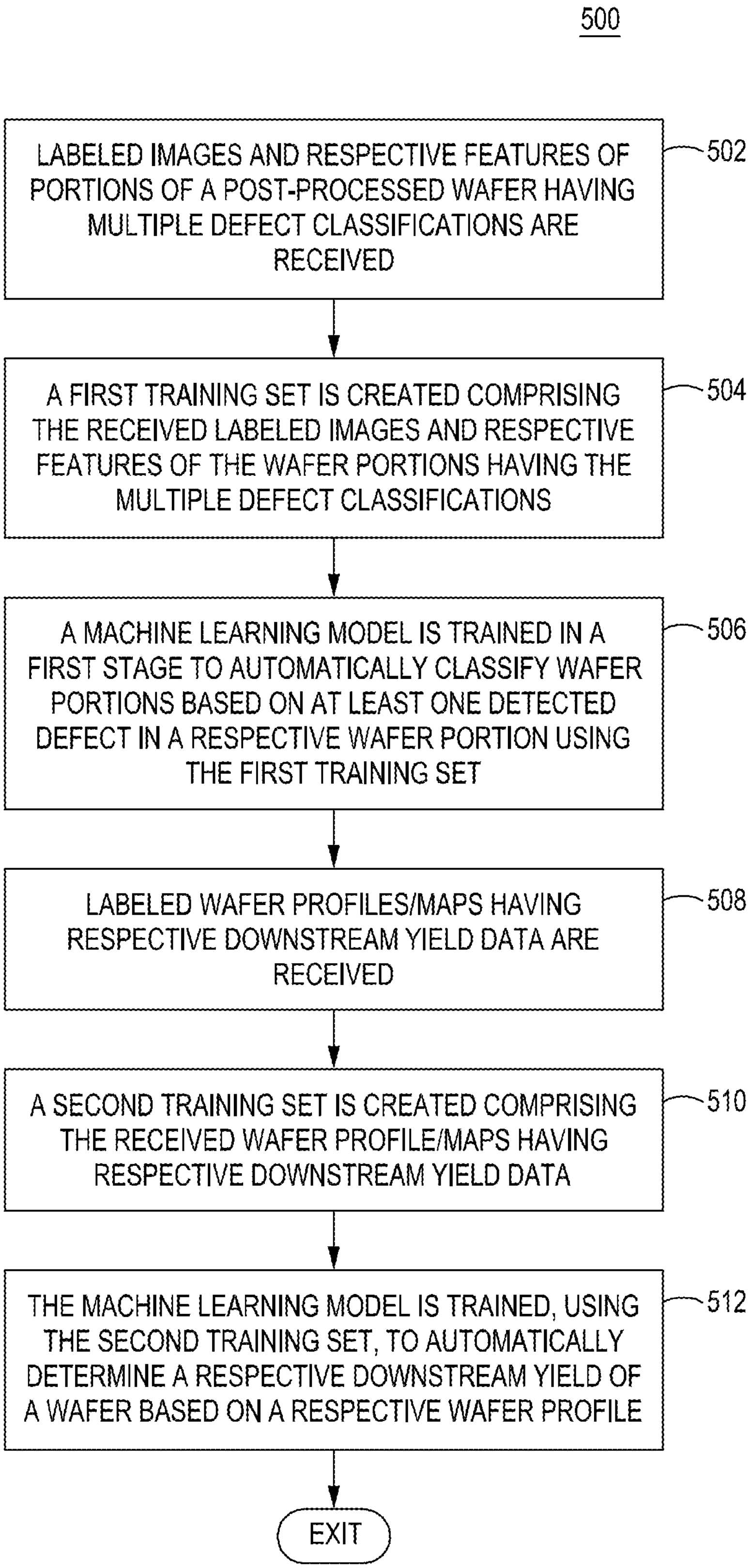
FIG. 5 depicts a flow diagram of a method for training a machine learning model for the automatic classification of at least respective portions of post-processed wafers in accordance with an embodiment of the present principles.

FIG. 5 depicts a flow diagram of a method 500 for training a machine learning model for the automatic defect detection and classification of at least a portion of a processed wafer in accordance with an embodiment of the present principles. The method can begin at 502 during which labeled images and respective features of portions of a post-processed wafer having multiple defect classification types are received. The method 500 can proceed to 504.

At 504, a first training set is created comprising the received labeled images and respective features of the wafer portions having the multiple defect classification types. The method 500 can proceed to 506.

At 506, the machine learning model is trained in a first stage to automatically classify wafer portions based on at least one detected defect in a respective wafer portion using the first training set. The method 500 can proceed to 508.

At 508, labeled wafer profiles/maps having respective downstream yield data are received. The method 500 can proceed to 510.

At 510, a second training set is created comprising the received wafer profiles/maps having respective downstream yield data. The method 500 can proceed to 512.

At 512, the machine learning model is trained, using the second training set, to automatically determine a respective downstream yield of a wafer based on a respective wafer profile. The method 500 can be exited.

Figure 6:
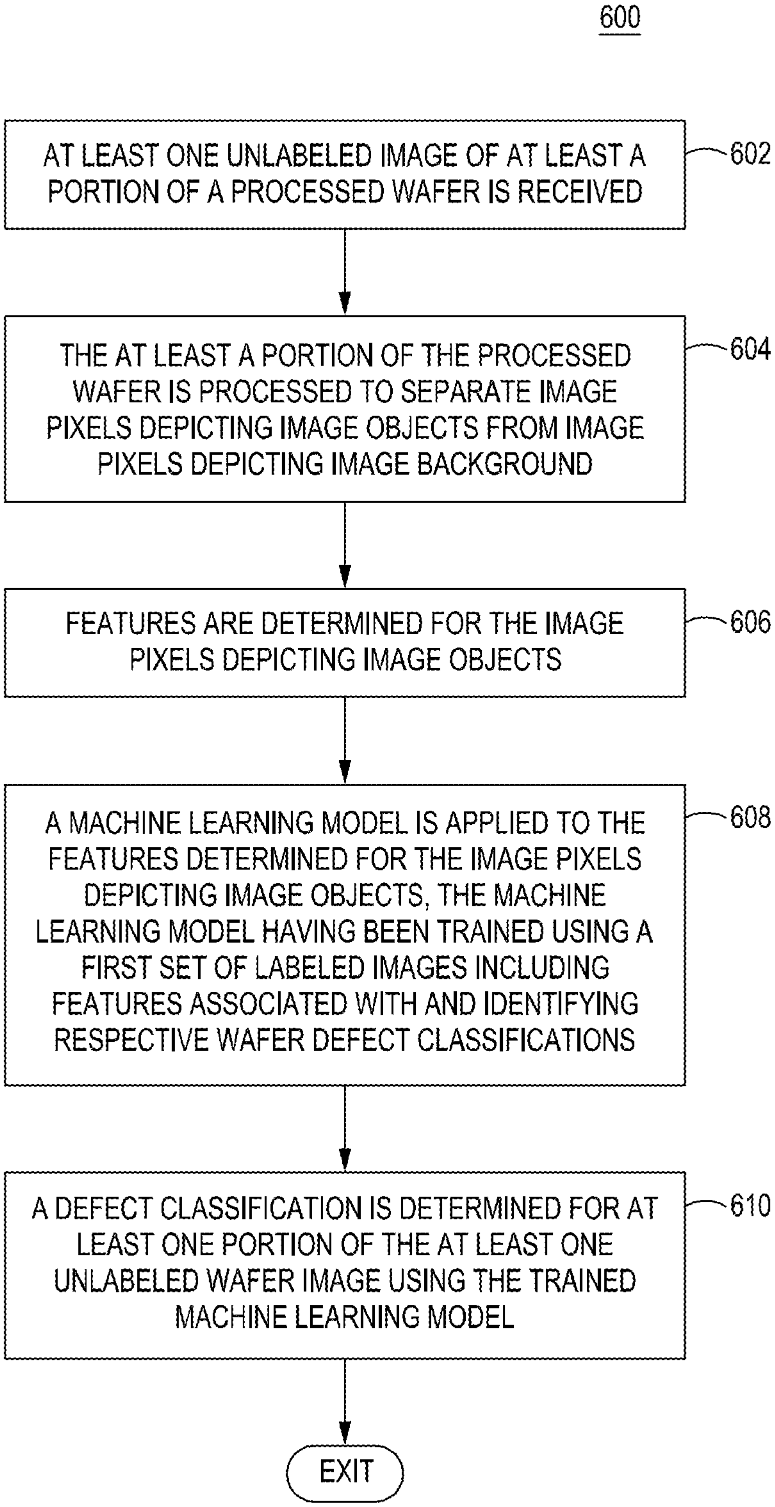
FIG. 6 depicts a flow diagram of a method for the automatic classification of at least respective portions of post-processed wafers in accordance with an embodiment of the present principles.

FIG. 6 depicts a flow diagram of a method 600 for the automatic defect detection and classification of at least a portion of a processed wafer using a trained machine learning model in accordance with an embodiment of the present principles. The method can begin at 602 during which at least one unlabeled image of at least a portion of a processed wafer is received. The method 600 can proceed to 604.

At 604, the at least a portion of the processed wafer is processed to separate image pixels depicting image objects from image pixels depicting image background. As described above, in some embodiments, instead of separating a processed wafer into pixels, in some embodiments of the present principles, the wafer can be separated into groups of pixels that, for example, comprise at least one die on the wafer. The method 600 can proceed to 606.

At 606, features are determined for the image pixels depicting image objects (features can be determined for identified dies). The method 600 can proceed to 608.

At 608, a machine learning model is applied to the features determined for the image pixels depicting image objects (dies), the machine learning model having been trained using a first set of labeled images including features associated with and identifying respective wafer defect classification types. The method 600 can proceed to 610.

At 610, a defect classification is determined for at least one portion of the at least one unlabeled wafer image using the trained machine learning model. The method 600 can be exited.

In some embodiments, the method 600 can further include, determining a downstream yield of at least one wafer depicted in the unlabeled image using the trained machine learning model, the machine learning model having been further trained using a second set of labeled wafer profiles having respective downstream yield data for imaged wafers to train the machine learning model to automatically determine a respective downstream yield of a wafer based on a respective wafer profile.

As depicted in FIG. 1, embodiments of a post-processing wafer defect detection and classification system of the present principles, such as the post-processing wafer defect detection and classification system 100 of FIG. 1, can be implemented in a computing device 700 in accordance with the present principles. That is, in some embodiments, wafer image data and the like can be communicated to a post-processing wafer defect detection and classification system of the present principles using the computing device 700 via, for example, any input/output means associated with the computing device 700. Classification data and downstream yield data determined by a post-processing wafer defect detection and classification system of the present principles can be presented to a user using an output device of the computing device 700, such as a display, a printer or any other form of output device.

Figure 7:
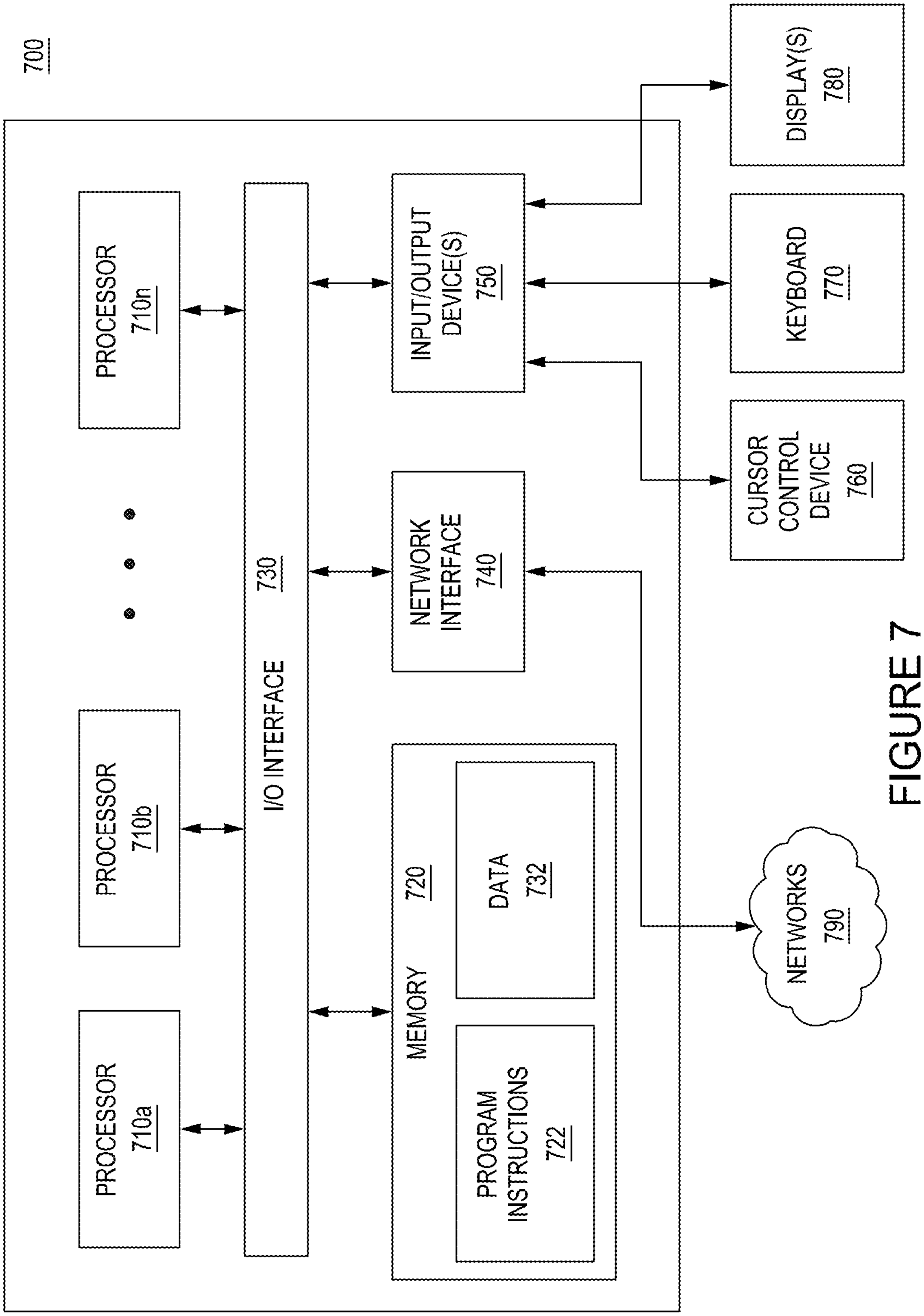
FIG. 7 depicts a high-level block diagram of a computing device suitable for use with embodiments of a post-processing wafer defect detection and classification system in accordance with an embodiment of the present principles.

For example, FIG. 7 depicts a high-level block diagram of a computing device 700 suitable for use with embodiments of a post-processing wafer defect detection and classification system in accordance with the present principles, such as the post-processing wafer defect detection and classification system 100 of FIG. 1. In some embodiments, the computing device 700 can be configured to implement methods of the present principles as processor-executable executable program instructions 722 (e.g., program instructions executable by processor(s) 710) in various embodiments.

In the embodiment of FIG. 7, the computing device 700 includes one or more processors 710*a*-710*n* coupled to a system memory 720 via an input/output (I/O) interface 730. The computing device 700 further includes a network interface 740 coupled to I/O interface 730, and one or more input/output devices 750, such as cursor control device 760, keyboard 770, and display(s) 780. In various embodiments, a user interface can be generated and displayed on display 780. In some cases, it is contemplated that embodiments can be implemented using a single instance of computing device 700, while in other embodiments multiple such systems, or multiple nodes making up the computing device 700, can be configured to host different portions or instances of various embodiments. For example, in one embodiment some elements can be implemented via one or more nodes of the computing device 700 that are distinct from those nodes implementing other elements. In another example, multiple nodes may implement the computing device 700 in a distributed manner.

In different embodiments, the computing device 700 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 700 can be a uniprocessor system including one processor 710, or a multiprocessor system including several processors 710 (e.g., two, four, eight, or another suitable number). Processors 710 can be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 can be configured to store program instructions 722 and/or data 732 accessible by processor 710. In various embodiments, system memory 720 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 720. In other embodiments, program instructions and/or data can be received, sent or stored upon different types of computer-accessible media or on similar media separate from system memory 720 or computing device 700.

In one embodiment, I/O interface 730 can be configured to coordinate I/O traffic between processor 710, system memory 720, and any peripheral devices in the device, including network interface 740 or other peripheral interfaces, such as input/output devices 750. In some embodiments, I/O interface 730 can perform any necessary protocol, timing or other data transformations to convert data signals from one component (e.g., system memory 720) into a format suitable for use by another component (e.g., processor 710). In some embodiments, I/O interface 730 can include support for devices attached through various types of peripheral buses, such as a variant of the Peripheral Component Interconnect (PCI) bus standard or the Universal Serial Bus (USB) standard, for example. In some embodiments, the function of I/O interface 730 can be split into two or more separate components, such as a north bridge and a south bridge, for example. Also, in some embodiments some or all of the functionality of I/O interface 730, such as an interface to system memory 720, can be incorporated directly into processor 710.

Network interface 740 can be configured to allow data to be exchanged between the computing device 700 and other devices attached to a network (e.g., network 790), such as one or more external systems or between nodes of the computing device 700. In various embodiments, network 790 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 750 can, in some embodiments, include one or more display terminals, keyboards, keypads, touchpads, scanning devices, voice or optical recognition devices, or any other devices suitable for entering or accessing data by one or more computer systems. Multiple input/output devices 750 can be present in computer system or can be distributed on various nodes of the computing device 700. In some embodiments, similar input/output devices can be separate from the computing device 700 and can interact with one or more nodes of the computing device 700 through a wired or wireless connection, such as over network interface 740.

Those skilled in the art will appreciate that the computing device 700 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 700 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 700 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 700 can further include a web browser.

Although the computing device 700 is depicted as a general-purpose computer, the computing device 700 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 8:
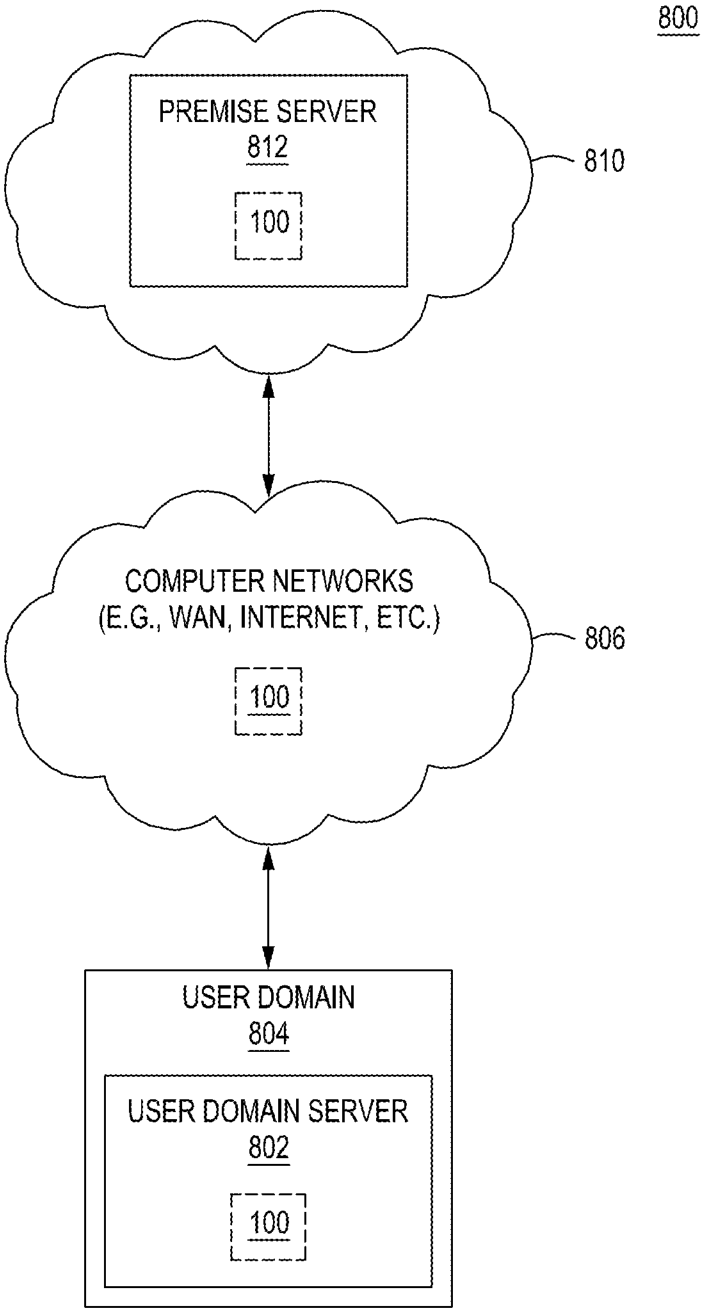
FIG. 8 depicts a high-level block diagram of a network in which embodiments of a post-processing wafer defect detection and classification system of the present principles can be applied in accordance with an embodiment.

FIG. 8 depicts a high-level block diagram of a network in which embodiments of a post-processing wafer defect detection and classification system of the present principles in accordance with the present principles, such as the post-processing wafer defect detection and classification system 100 of FIG. 1, can be applied. The network environment 800 of FIG. 8 illustratively comprises a user domain 802 including a user domain server/computing device 804. The network environment 800 of FIG. 8 further comprises computer networks 806, and a cloud environment 810 including a cloud server/computing device 812.

In the network environment 800 of FIG. 8, a post-processing wafer defect detection and classification system in accordance with the present principles, such as the post-processing wafer defect detection and classification system of FIG. 1, can be included in at least one of the user domain server/computing device 804, the computer networks 806, and the cloud server/computing device 812. That is, in some embodiments, a user can use a local server/computing device (e.g., the user domain server/computing device 804) to detect and classify defects on at least a portion of a processed wafer in accordance with the present principles.

In some embodiments, a user can implement a system for detecting and classifying defects on at least a portion of a processed wafer in the computer networks 806 in accordance with the present principles. Alternatively or in addition, in some embodiments, a user can implement a system for detecting and classifying defects on at least a portion of a processed wafer in the cloud server/computing device 812 of the cloud environment 810 to in some embodiments provide downstream yield data of processed wafer in accordance with the present principles. For example, in some embodiments it can be advantageous to perform processing functions of the present principles in the cloud environment 810 to take advantage of the processing capabilities and storage capabilities of the cloud environment 810. In some embodiments in accordance with the present principles, a system for detecting and classifying defects on at least a portion of a processed wafer can be located in a single and/or multiple locations/servers/computers to perform all or portions of the herein described functionalities of a system in accordance with the present principles. For example, a post-processing wafer defect detection and classification system of the present principles can be located in one or more than one of the user domain 802, the computer network environment 806, and the cloud environment 810 for detecting and classifying wafer defects in accordance with the present principles.

Those skilled in the art will appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 600 can be transmitted to the computing device 600 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

While the foregoing is directed to embodiments of the present disclosure, other and further embodiments of the disclosure may be devised without departing from the basic scope thereof.

The invention claimed is:

1. A method for training a machine learning (ML) model for automatic defect detection and classification of at least a portion of a processed wafer, comprising:

receiving labeled images having multiple defect classification types and respective features for at least a portion of a post-processed wafer;

creating a first training set comprising the received labeled images having the multiple defect classification types and respective features for the portions of the wafer;

training the machine learning model in a first stage to automatically classify wafer portions based on at least one detected defect in a respective wafer portion using the first training set;

receiving labeled wafer profiles having respective downstream yield data;

creating a second training set comprising the labeled wafer profiles having the respective downstream yield data; and training the machine learning model, using the second training set, to automatically determine a respective downstream yield of a wafer based on a respective wafer profile.

2. The method of claim 1, wherein the multiple defect classification types comprise at least one of a good category, a void category, or a delamination category.

3. The method of claim 1, wherein the ML model comprises at least one of a convolutional neural network model or a recurrent neural network model.

4. A method for automatic defect detection and classification of at least a portion of a processed wafer using a trained machine learning (ML) model, comprising: receiving at least one unlabeled image of at least a portion of a processed wafer; processing the at least a portion of the processed wafer to separate image pixels depicting image objects from image pixels depicting image background; determining features for the image pixels depicting image objects; applying the trained ML model to the features determined for the image pixels depicting image objects, the machine learning model having been trained using a first set of labeled images including features associated with and identifying respective wafer defect classification types; and determining a defect classification for at least one portion of the at least one unlabeled wafer image using the trained machine learning model; and determining a downstream yield of at least one wafer depicted in the unlabeled image using the trained machine learning model, the machine learning model having been further trained using a second set of labeled wafer profiles having respective downstream yield data for imaged wafers to train the machine learning model to automatically determine a respective downstream yield of a wafer based on a determined, respective wafer profile.

5. The method of claim 4, further comprising determining a wafer profile for at least one wafer depicted in the unlabeled wafer image by compiling determined defect classification types for at least some of the portions of the at least one portion of the at least one unlabeled wafer image.

6. The method of claim 4, wherein the downstream yield of a wafer is determined based on a compilation of an electrical conductivity of each of the pixels of the at least the portion of the wafer.

7. The method of claim 5, further comprising:

determining if a wafer contains a critical defect from the at least one determined wafer profile.

8. The method of claim 4, wherein the wafer defect classification types comprise at least one of a good category, a void category, or a delamination category.

9. The method of claim 4, wherein the trained ML model comprises at least one of a convolutional neural network model or a recurrent neural network model.

10. An apparatus for training a machine learning (ML) model for automatic defect detection and classification of at least a portion of a processed wafer, comprising:

a processor; and a memory having stored therein at least one program, the at least one program including instructions which, when executed by the processor, cause the apparatus to perform a method, comprising;

receiving labeled images having multiple defect classification types and respective features for at least a portion of a post-processed wafer;

creating a first training set comprising the received labeled images having the multiple defect classification types and respective features for the portions of the wafer;

training the machine learning model in a first stage to automatically classify wafer portions based on at least one detected defect in a respective wafer portion using the first training set;

receiving labeled wafer profiles having respective downstream yield data;

creating a second training set comprising the labeled wafer profiles having the respective downstream yield data; and training the machine learning model, using the second training set, to automatically determine a respective downstream yield of a wafer based on a respective wafer profile.

11. The apparatus of claim 10, wherein the multiple defect classification types comprise at least one of a good category, a void category, or a delamination category.

12. The apparatus of claim 10, wherein the ML model comprises at least one of a convolutional neural network model or a recurrent neural network model.

13. An apparatus for automatic defect detection and classification of at least a portion of a processed wafer using a trained machine learning (ML) model, comprising: a processor; and a memory having stored therein at least one program, the at least one program including instructions which, when executed by the processor, cause the apparatus to perform a method, comprising; receiving at least one unlabeled image of at least a portion of a processed wafer; processing the at least a portion of the processed wafer to separate image pixels depicting image objects from image pixels depicting image background; determining features for the image pixels depicting image objects; applying the trained ML model to the features determined for the image pixels depicting image objects, the machine learning model having been trained using a first set of labeled images including features associated with and identifying respective wafer defect classification types; and determining a defect classification for at least one portion of the at least one unlabeled wafer image using the trained machine learning model; and determining a downstream yield of at least one wafer depicted in the unlabeled image using the trained machine learning model, the machine learning model having been further trained using a second set of labeled wafer profiles having respective downstream yield data for imaged wafers to train the machine learning model to automatically determine a respective downstream yield of a wafer based on a determined, respective wafer profile.

14. The apparatus of claim 13, further comprising determining a wafer profile for at least one wafer depicted in the unlabeled wafer image by compiling determined defect classification types for at least some of the portions of the at least one portion of the at least one unlabeled wafer image.

15. The apparatus of claim 13, wherein a downstream yield of a wafer is determined based on a compilation of an electrical conductivity of each of the pixels of the at least the portion of the wafer.

16. The apparatus of claim 14, further comprising:

determining if a wafer contains a critical defect from the at least one determined wafer profile.

17. The apparatus of claim 13, wherein the wafer defect classification types comprise at least one of a good category, a void category, or a delamination category.

18. The apparatus of claim 13, wherein the trained ML model comprises at least one of a convolutional neural network model or a recurrent neural network model.

* * * * *